J. E. CROSBY.
Checkermen.

No. 218,860.    Patented Aug. 26, 1879.

Witnesses:
J. W. Garner
W. S. O. Haines

Inventor:
Jos. E. Crosby
per
F. A. Lehmann,
Atty.

UNITED STATES PATENT OFFICE.

JOSEPH E. CROSBY, OF NEW YORK, N. Y.

IMPROVEMENT IN CHECKER-MEN.

Specification forming part of Letters Patent No. 218,860, dated August 26, 1879; application filed February 17, 1879.

*To all whom it may concern:*

Be it known that I, Jos. E. CROSBY, of New York, in the county of New York and State of New York, have invented certain new and useful Improvements in Checkers; and I do hereby declare the following to be a full, clear, and exact description of the invention, such as will enable others skilled in the art to which it pertains to make and use it, reference being had to the accompanying drawings, which form part of this specification.

My invention relates to an improvement in checkers; and it consists in making one or more circumferential concavities in each checker-man, so as to prevent it from slipping from the fingers as it is being lifted, as will be more fully described hereinafter.

Figure 1:
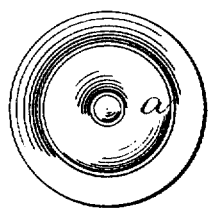
Figure 2:
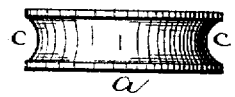
Figure 3:

The accompanying drawings represent my invention, Figure 1 showing a top view, and Figs. 2 and 3 side views of the same.

$a$ represents a common checker, which has a groove, $c$, of any desired size or depth made entirely around its edge. The groove extends nearly from the top to the bottom of the edge; but it is evident that instead of one wide groove there may be two or more smaller ones, as shown in Fig. 2.

Where the checkers are made with straight edges, as is usual, they are constantly slipping from the fingers, and either falling on the floor or causing trouble by displacing others. In order to obviate this trouble each checker is grooved around its edge, so as to enable the fingers to get a firm hold of it, and thus enable it both to be held in any position or to be picked up readily.

Having thus described my invention, I claim—

As a new article of manufacture, the checker-man $a$, provided with one or more circumferential concavities, to prevent the slipping of the checker-man from the fingers while being lifted, all as and for the purposes set forth.

In testimony that I claim the foregoing I have hereunto set my hand this 11th day of February, 1879.

JOSEPH E. CROSBY.

Witnesses:
  LONNE W. WHITE,
  EDWARD GREEN, Jr.